United States Patent Office 3,425,663
Patented Feb. 4, 1969

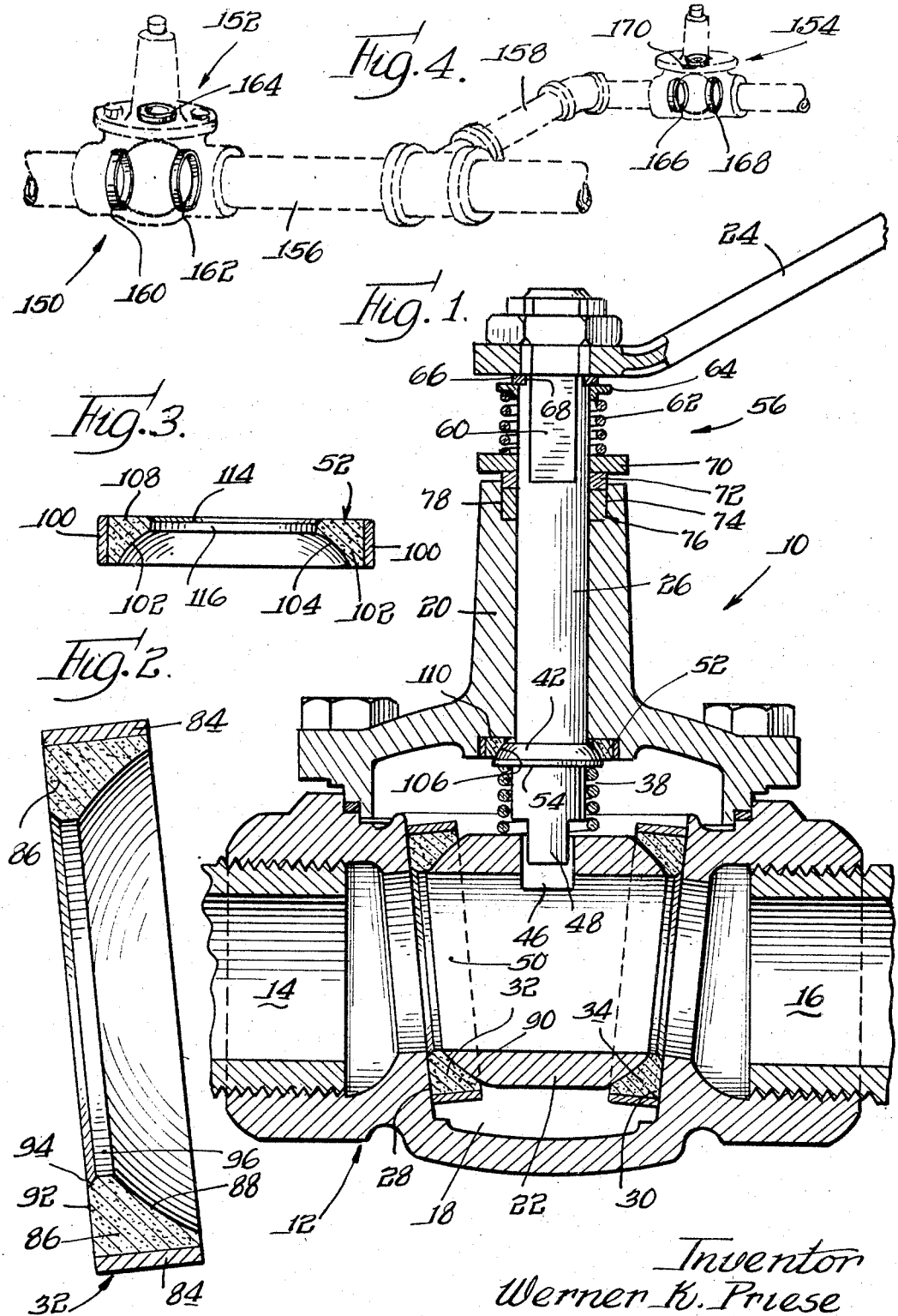

3,425,663
BALL VALVE ASSEMBLY
Werner K. Priese, Barrington, Ill., assignor to Hills-McCanna Company, Carpentersville, Ill., a corporation of Illinois
Filed June 28, 1966, Ser. No. 561,297
U.S. Cl. 251—180     4 Claims
Int. Cl. F16k 25/04, 31/44, 5/06

ABSTRACT OF THE DISCLOSURE

A valve assembly for conducting high temperature fluid comprising first and second passageways formed in a valve body having inner openings into a chamber therein, a pair of carbon graphite valve seats, each of which is mounted at a respective inner opening of a passageway, a valve stem extending into said body and having a valve ball mounted on the inner end thereof within the chamber, the valve ball being in engagement with the carbon graphite valve seats and a valve stem seal mounted within the chamber between a flange of the valve stem and a carbon graphite seal. A pair of spring assemblies is provided, one being mounted on the valve stem between the flange and the valve ball, and the other outside the valve body engaging the stem member. The spring assemblies serve two purposes, one being to seal the respective carbon graphite stem seal and valve seats and the other, to take up changes in compressive stresses on the seal and valve seats due to thermal expansion of the valve body caused by the flow therethrough of the high temperature fluid, thereby to maintain a relatively constant sealing force for the carbon graphite seal and seats.

---

This invention relates generally to a valve assembly and more particularly to a ball valve seat and seal assembly suitable for high temperature service.

The polymeric valve seats and seals in prior art ball valves are generally unsatisfactory for use in systems conducting fluid having a temperature of around 900 degrees F. Polymeric seats and seals, commonly used in ball valves, generally deteriorate after a short period in systems operating above 600 degrees F. Therefore, these seats and seals require frequent replacement when used in systems handling high temperature fluids.

The maintenance of an adequate supply of valve seats and stem seals for replacement and manufacturing purposes has long been a problem to both the users and makers of valves. Due to the use of stem and seat seals of different sizes and configurations, manufacturers must maintain comparatively large inventories of both seat and stem seals to supply their production needs and the replacement needs of their customers. The users of valves must also maintain a supply of many different seat and stem seals so that the proper seal will be quickly available when required for replacement purposes. The valve stem and seat seal inventory of both manufacturers and users of valves represents a large amount of investment capital which is tied up by these unproductive seal inventories.

Therefore, one of the objects of this invention is to provide a valve assembly which eliminates the need for the maintenance of large inventories of valve seat and stem seals.

Another object of this invention is to provide a valve assembly having stem and seat seals which are satisfactory for long periods of use at high temperatures.

These and other objects and features of the invention will become more apparent upon a reading of the following detailed description taken in connection with the following drawings, wherein:

FIG. 1 is a sectional view of a valve assembly forming a preferred embodiment of my invention;

FIG. 2 is an enlarged view of one embodiment of the valve seats utilized in the valve assembly of FIG. 1;

FIG. 3 is an enlarged view of one embodiment of the stem seal utilized in the valve assembly of FIG. 1; and FIG. 4 is a schematic representation of a system utilizing a first relatively large valve assembly and a second comparatively small valve assembly both of which are similar to that of FIG. 1.

Referring now to the drawings in greater detail, there is shown in FIG. 1 a valve assembly 10 which forms a preferred embodiment of my invention. The valve assembly 10 includes a body 12 in which two fluid passages 14 and 16 are formed. The fluid passages 14 and 16 terminate at their inner ends in a chamber 18 formed in the body 12. An upper end of the chamber 18 is closed by the valve bonnet 20. A flow control ball 22 is rotatably mounted in the chamber 18 and can be moved from the open position shown in FIG. 1 to a closed position by means of a handle 24 which is attached to a valve stem 26.

The inner ends of the fluid passages 14 and 16 are encircled by a pair of inwardly and downwardly converging annular support surfaces 28 and 30. A pair of annular valve seats 32 and 34 are positioned in abutting engagement with the support surfaces 28 and 30 and are positioned in sliding engagement with an arcuate exterior surface of the valve ball 22. This abutting relationship is maintained by means of a spring 38 which is mounted coaxially with the valve stem 26 and presses against a surface 40 of the ball 22 and an annular flange 42 integrally formed with the stem 26 of the valve. The spring 38 also maintains a tight sealing engagement between the arcuate exterior surface of the valve ball 22 and the valve seats 32 and 34. The firm sealing engagement is maintained by the spring 38 even when the valve seats 32 and 34 begin to wear due to the rotation of the valve ball when the valve is opened and closed.

The valve ball includes an upwardly extending rectangular passage or socket 46. The valve stem 26 includes a downwardly extending tang 48 which is loosely fitted into the socket 46. The loose fit between the tang 48 and socket 46 enables fluid to escape from a central bore 50 of the ball valve into the chamber 18. Since the fluid in the passages 14 and 16 and bore 50 of the ball is under pressure, the fluid pressure is transmitted to the cavity 18 and forces the outwardly extending flange 42 of the stem 26 upwardly into engagement with an annular stem seal 52. The flange 42 is also maintained in sealing contact with the stem seal 52 by the spring 38 which presses upwardly, against a lower surface 54 of the flange 42, and downwardly against the upper surface 40 of the ball 22.

The flange 42 is also pulled upwardly into sealing engagement with the stem seal 52 by a spring assembly 56 which is mounted coaxially with an upper end portion 60 of the valve stem 26. The spring assembly 56 includes a spring 62 which presses upwardly against a spring retainer 64. The spring retainer 64 engages a retaining ring 66 secured in a groove 68 in the upper portion 60 of the valve stem. A lower end of the spring 62 presses downwardly against a thrust flange or washer 70 and ring 72. The annular thrust ring 72 is positioned in sliding engagement with a cylindrical upwardly extending interior sidewall surface 74 of a cavity 76. A bearing ring 78 is positioned within the cavity 76 in sliding engagement with a lower surface of the thrust ring 72. The bearing ring 78 is made of sintered carbon-graphite, to provide a smooth almost frictionless bearing surface for the ring 72. Since the stem seal 52 forms a fluid joint at the base of the stem 26, the bearing 78 need not be in fluid tight sealing engagement with the valve stem 26.

From the foregoing description it will be apparent that the annular flange 42 of the valve stem is urged into sealing engagement with the stem seal 52 by three separate forces. The first of these forces is the force exerted by fluid pressure within the chamber 18 on the lower surface 54 of the flange 42 to press the flange upwardly against the stem seal 52. Similarly, the spring 38 will press upwardly against the flange 42 while pressing the ball 22 downwardly into sealing engagement with the valve seats 32 and 34. The valve stem 26 is also pulled upwardly into sealing engagement with the stem seal 52 by the spring assembly 56 which presses downwardly against the bearing 78.

The valve assembly 10 is intended for use in systems conducting fluid at relatively high temperatures, that is temperatures of approximately 900 degrees F. The valve seats 32 and 34 and the stem seal 52 are made of sintered carbongraphite. These valve seats and seals can withstand high temperatures for long periods of time without deteriorating. These seats and seals also provide a bearing surface having a relatively low coefficient of friction against which the ball 22 and stem flange 42 are rotated. It will be apparent to those skilled in the art that if a polymeric valve stem seal and ball seats were utilized, the stem seal and ball seats would deteriorate after a relatively short period of use.

One of the characteristics of carbon-graphite is its tendency to fail when subjected to excessive compressive stressses. The mounting arrangement previously described wherein the valve ball 22 is pressed by the resilient spring 38 into sealing engagement with the valve seats 32 and 34, and wherein the stem flange 42 is pressed into sealing engagement with the stem seal 52 by the springs 38 and 62, is particularly advantageous when utilized with carbon-graphite sealing members in a system for conducting high temperautre fluids. The high temperature fluids will cause thermal expansion to occur in the valve assembly 10. If the valve stem and ball is rigidly secured to the body of the valve, the thermal expansion of the valve body causes increased compressive stress to be applied against the valve seats and the stem seal. By using the spring assembly 56 to resiliently urge the flange 42 into sealing engagement with the stem seal 52, the compressive stresses in the stem seal 52 remain relatively constant when the valve body expands. The spring absorbs the thermal expansion and the spring rate does not, for the relatively small distances involved, vary so that the pressure on the seal 52 remains relatively constant. Similarly, the valve ball 22 is pressed downwardly by the spring 38 against the valve seats 32 and 34 with a substantially constant pressure even though the body of the valve expands. If the carbon-graphite seats and stem seal were utilized in the relatively rigid structure found in prior art valves they would tend to fail due to the compressive stresses which result from thermal expansioin of the valve assembly in a system conducting high temperature fluids, or the compressive stresses would result in high frictional forces between ball and seats, rendering the valve inoperable.

The valve stem 26 and bonnet 20 are elongated to enable insulation to be packed securely around the valve. The insulation keeps the handle 24 of the valve cool while permitting operating personnel to open and close the valve. The insulation also cuts down on heat losses from piping system and protects the operating personnel against burns from the relatively hot body 12 of the valve.

Referring now to FIGS. 2 and 3, taken in conjunction with FIG. 1, wherein there is shown an enlarged cross-sectional view of one embodiment of the valve seat 32 and stem seal 52. The valve seat 32 includes a metallic seat ring 84 which surrounds the carbon-graphite seal 86. The carbon-graphite ring seal 86 has an arcuate inner surface 88 which is pressed in sealing engagement against the similarly curved arcuate surface 90 of the ball valve 22. The ring seal 86 also includes a flat outer surface 92 which is pressed into sealing contact with the support surface 28. The outer surface and arcuate inner surface of the ring seal are interconnected by a sloping side wall 94 and a cylindrical side wall 96 through which fluid is conducted from the passage 14 to the bore 50 of the ball 22. The seat 34 is, as will be apparent from an inspection of FIG. 1, constructed in a manner similar to that for the seat 32. The seat 34 also is positioned in sliding engagement with the arcuate surface 90 of the ball valve.

The stem seal 52 includes a metallic ring 100 which encircles a carbon-graphite stem seal 102. The carbon-graphite stem seal 102 includes an arcuate inner surface 104 which engages the similarly curved arcuate outer surface 106 of the flange 42. The opposite surface 108 of the stem seal 52 is flat and engages an annular support surface 110 which extends around the valve stem 26. The arcuate inner surface and plane outer surface are interconnected by a beveled side wall 114 and a cylindrical interior side wall 116.

From an inspection of FIGS. 1 to 3, it will be apparent that the valve seats 32 and 34 are substantially identical in construction. That is, the valve seat 34 could, if desired, be rotated and substituted for the valve seat 32. The stem seal 52 is geometrically similar to the valve seats 32 and 34. By being geometrically similar it is meant that the stem seal has the same shape and differs only in size and position from the valve seats 32 and 34. Thus, by a suitable enlargement of the stem seal 52, the stem seal would be exactly the same as the valve seats 32 and 34. Similarly, the arcuate surface 106 of the flange 42 is geometrically similar to the arcuate surface 90 of the valve ball 22. That is, the curvature of the arcuate surface 106 is such that by a suitable enlargement of the surface 106 the surface would be congruent with the surface 90 of the valve ball 22.

Referring now to FIG. 4, a piping system 150 is schematically shown. The piping system 150 includes a first relatively large valve 152 and a second comparatively small valve 154. Both of the valves 152 and 154 are constructed in a manner similar to the valve assembly 10. That is, the only material structural difference between the valves 152 and 154 is their size. The valve 152 is positioned in a main pipe line 156 to which a smaller feeder line 158 is connected. The flow of fluid through the feeder line 158 is controlled by the valve 154.

The valve 152 includes two valve seats 160 and 162, and a stem seal 164. The valve 154 also includes two valve seats 166 and 168, and a stem seal 170. The valve seats 160, 162, 166 and 168 and the stem seals 164 and 170 are constructed similar to the valve seats 32, 34 and stem seal 52. Thus, the valve seats and stem seals shown in FIGS. 1 to 4 are all geometrically similar and differ from each other only in their relative size. The valve 154 has been constructed so that the diameter of the valve seats 166 and 168 is the same as the diameter of the stem seal 164 in the valve 152. Since the stem seal 164 and valve seats 166 and 168 are of the same size and are geometrically similar, the stem seal 164 and valve seats 166 and 168 are physically interchangeable.

The use of stem seals in relatively large valves which are interchangeable with valve seats in relatively small valves permits a manufacturer to retain a small inventory of valve seats and seals, since the same member can be used as either a stem seal or a valve seat depending upon the size of the valve assembly in which it is placed. This interchangeability of components also permits a user of valves to maintain a comparatively small inventory of replacement parts, since the replacement member for the valve stem seal 164 can also be utilized as a replacement for the valve seats 166 and 168. Therefore, by having the curvature of the ball 22 of the valve geometrically similar to the curvature of the flange 42 of the stem of the valve, the valve seats and stem seals can do double duty and reduce the required inventory of valve seats and stem seals.

For purposes of affording a more complete understanding of the invention it is advantageous now to provide a functional description of the mode in which the component parts cooperate. The valve assembly 10 includes a pair of substantially identical seat members 32 and 34 which are pressed into sealing contact with the support surfaces 28 and 30 of the valve body by a spring 38 and the valve ball 22. The joint between the stem 26 of the valve and the body 12 is sealed by a stem seal 52 which is pressed against a support surface 110 by the arcuate flange 42. The arcuate flange 42 is retained in sealing engagement with the seal 52 by the spring 38 and a spring assembly 56 which is mounted exteriorly of the valve body and coaxially with the stem 26. When high temperature fluid, that is fluid having a temperature above 850 degrees, is conducted through the fluid passages 14 and 16 the valve assembly will expand. However, the pressure on the stem seal 52 and the valve seats 32 and 34 will remain substantially constant since the springs 38 and 62 will absorb the thermal expansion of the body 12 of the valve while maintaining a substantially constant pressure on the valve seats and stem seal. This maintenance of constant pressure on the valve seats and stem seal is particularly important, since carbon-graphite valve seats and stem seals are utilized to provide the longer service life under the high temperature conditions which are present. The carbon-graphite seal and seats are easily broken under excessive compressive stresses which are often present when thermal expansion occurs in a valve body.

The valve seats 32 and 34 and stem seal 52 are geometrically similar, so that a stem seal 52 can, if desired, be utilized as a valve seat in a similar but smaller valve assembly. The valve seats 32 and 34, on the other hand, can be utilized as stem seals in a similar but larger valve assembly. This interchangeability of the valve seats and stem seals is facilitated by the fact that the arcuate sealing surfaces of the stem flange 42 and ball 22 are geometrically similar in curvature.

While a particular exemplary embodiment of the invention has been shown, it should be understood, of course, that the invention is not limited thereto, since many modifications may be made; and it is, therefore, contemplated to cover by the appended claims any such modifications as fall within the true spirit and scope of the invention.

What is claimed is:

1. A valve assembly for conducting fluid having high temperatures comprising: a body means defining a chamber, first and second fluid passage means formed in said body means and having inner ends opening into said chamber, a first support surface extending around an inner end of said first passage means, and a second support surface extending around an inner end of said second passage means; flow control means comprising a valve ball positioned in said chamber for regulating a flow of fluid through said first and second passage means; a first valve seat formed of a carbon graphite material, positioned in said chamber in sliding engagement with the arcuate surface of said valve ball and abutting said first support surface; a second valve seat formed of a carbon graphite material positioned in said chamber in sliding engagement with said arcuate surface of said valve ball and abutting said second support surface; a stem member engaging at one end thereof said valve ball and extending through said body means for enabling said valve ball to be rotated for regulating the flow of fluid through said first and second passage means, a third support surface being formed in said body means and extending around said stem member, said stem member having a flange means located within said chamber and being associated with said third support surface; and a stem seal member formed of a carbon graphite material positioned in sliding engagement with an arcuate surface of said flange means mounted on said one end of said stem member and abutting said third support surface, a first spring means between said flange means and said valve ball and a second spring means mounted outside of said chamber in engagement with said stem member, whereby said first and second spring means serve to urge said flange means into sealing engagement with said stem seal member and said first spring means further serves to urge said valve ball into sealing engagement with said first and second valve seats, said first and second spring means taking up changes in compressive stresses on said seal and said valve seats, respectively, due to thermal expansion of said valve body caused by the flow therethrough of said high temperature fluid thereby to maintain a relatively constant sealing force on said seal and valve seats, respectively, and to prevent the failure thereof.

2. An assembly as set forth in claim 1 wherein: a third fluid passage means is formed in said valve ball to enable fluid from said first and second passage means to flow into said chamber, whereby fluid pressure is utilized in urging said flange means into sealing engagement with said stem seal member.

3. A valve assembly for use in conducting high temperature fluids, comprising: a body means defining a chamber, first and second fluid passage means formed in said body means and having an inner end opening into said chamber, a first support surface extending around an inner end of said first passage means, and a second support surface extending around an inner end of said second passage means; flow control means positioned in said chamber for regulating the flow of fluid through said first and second passage means; a first valve seat formed of a carbon graphite material positioned in said chamber in sliding engagement with an arcuate surface area of said flow control means and abutting said first support surface; a second valve seat formed of a carbon graphite material positioned in said chamber in sliding engagement with said arcuate surface area of said flow control means and abutting said second support surface; a stem member engaging said flow control means and extending through said body means for enabling said flow control means to be moved to regulate the flow of fluid through said first and second passage means, a third support surface being formed in said body means and extending around said stem member, said stem member having a flange means located within said chamber and being associated with said third support surface; and a stem seal member positioned in sliding engagement with an arcuate surface area of said flange means and abutting said third support surface, a carbon graphite bearing ring mounted on said body means and extending around said stem member; a first spring assembly mounted on said stem member between said flange means and said flow control means; and a second spring assembly mounted coaxially with said stem member and pressing against said bearing ring, said first and second spring assemblies urging said flange means into sealing engagement with said stem seal member and said first spring assembly further urging said flange means into sealing engagement with with said first and second valve seats, said first and second spring assemblies taking up changes in compressive stresses on aid bearing ring, seal and valve seats, respectively, due to thermal expansion of said valve body caused by the flow therethrough of said high temperature fluid thereby to maintain a relatively constant sealing force on said graphite ring, seal and valve seats, and to prevent the failure thereof.

4. An assembly as set forth in claim 3 wherein: a third fluid passage means is formed in said flow control member to enable fluid to flow from said first and second passage means into said chamber, whereby the fluid in said chamber urges said flange means into sealing engagement with said stem seal member.

References Cited

UNITED STATES PATENTS

| | | | |
|---|---|---|---|
| 1,791,914 | 2/1931 | Tomlinson | 251—184 |
| 2,191,232 | 2/1940 | Heinen | 251—174 |
| 2,504,863 | 4/1950 | Monroe | 277—33 |
| 2,627,443 | 2/1953 | Becker | 308—238 XR |
| 3,107,080 | 10/1963 | Priese. | |
| 3,159,177 | 12/1964 | Hott | 251—368 XR |
| 3,231,235 | 1/1966 | Anderson | 251—214 |
| 3,239,191 | 3/1966 | Widera | 251—214 XR |
| 3,298,753 | 1/1967 | Eaton | 308—238 XR |

FOREIGN PATENTS

| | | |
|---|---|---|
| 519,462 | 12/1955 | Canada. |
| 1,000,129 | 10/1951 | France. |

HAROLD W. WEAKLEY, *Primary Examiner.*

U.S. Cl. X.R.

251—214, 315, 317

UNITED STATES PATENT OFFICE
CERTIFICATE OF CORRECTION

Patent No. 3,425,663                                                      February 4, 1969

Werner K. Priese

It is certified that error appears in the above identified patent and that said Letters Patent are hereby corrected as shown below:

Column 2, line 36, "The" should read -- This --. Column 3, line 39, "temperautre" should read -- temperature --; line 68, "from piping system" should read -- from the piping system --; line 75, "carbon-graphite seal" should read -- carbon-graphite ring seal --. Column 6, line 63, "said flange" should read -- said flow control --; line 64, cancel "with said"; line 66, "on aid bearing" should read -- on said bearing --.

Signed and sealed this 31st day of March 1970.

(SEAL)
Attest:

Edward M. Fletcher, Jr.                              WILLIAM E. SCHUYLER, JR.
Attesting Officer                                              Commissioner of Patents